United States Patent [19]

Eastom

[11] Patent Number: 4,974,647
[45] Date of Patent: Dec. 4, 1990

[54] CONTAINER FOR THE COLLECTION, STORAGE AND DISPOSAL OF NEW AND SPENT LIQUIDS

[76] Inventor: James T. Eastom, 1291 Via Encinos, Fall Brook, Calif. 92028

[21] Appl. No.: 476,751

[22] Filed: Feb. 8, 1990

[51] Int. Cl.$^5$ .......................... B67C 11/04; B65B 39/00
[52] U.S. Cl. ........................................ 141/98; 220/573; 184/1.005; 184/106; 141/331; 141/333; 141/339; 141/341
[58] Field of Search ................. 220/1 C; 141/98, 331, 141/332, 333, 334, 339, 340, 341, 342, 343; 184/1.5, 106; 222/568, 465.1, 466; 206/223

[56] References Cited

U.S. PATENT DOCUMENTS

| | | | |
|---|---|---|---|
| 584,275 | 6/1897 | Sevier | 141/343 |
| 1,225,610 | 5/1917 | Garner | 141/343 |
| 2,174,228 | 9/1939 | Perkins | 141/339 |
| 2,675,945 | 4/1954 | Hahn | 222/568 X |
| 3,410,438 | 11/1968 | Bartz | 184/106 X |
| 4,010,863 | 3/1977 | Ebel | 220/1 C |
| 4,114,660 | 9/1978 | Arruda | 141/98 |
| 4,301,841 | 11/1981 | Sandow | 141/98 |
| 4,332,282 | 6/1982 | Strange | 141/1 |
| 4,392,552 | 7/1983 | Partridge | 184/106 |
| 4,452,381 | 6/1984 | Freeman | 222/465.1 |
| 4,488,584 | 12/1984 | Hestehave et al. | 141/339 |
| 4,524,866 | 6/1985 | Pollacco | 206/223 |
| 4,557,395 | 12/1985 | DeLay, Jr. | 220/1 C X |
| 4,640,431 | 2/1987 | Harrison | 220/1 C |
| 4,702,290 | 10/1987 | Perez | 141/332 |
| 4,802,599 | 2/1989 | Hill | 220/1 C |

Primary Examiner—Ernest G. Cusick
Attorney, Agent, or Firm—Ross, Ross & Flavin

[57] ABSTRACT

A system for collecting used oil from an engine and/or pouring new oil into the engine. The system envisions an open-topped drain pan which can be used in draining the oil, the drain pan being placed below the drain plug of the engine. The wide mouth of the open top ensures against oil spillage on the pan side wall. The pan is also provided with a top or cover having a diameter complimental to the pan diameter and is threadedly engageable therewith for sealing purposes when sealing is desired. The cover includes a spout at one side thereof to facilitate the draining of the used oil therefrom if such is desired or the pouring of new oil from within the pan into the engine, also as desired. The pan also includes a manually engageable rim portion for facilitating the transport of the pan to a distant location for the proper disposal of the used oil. And further, there is provided within the pan and integral therewith an upstanding base support for the seating thereupon of an oil filter for the successful draining of used oil therefrom and into the pan.

1 Claim, 5 Drawing Sheets

CONTAINER FOR THE COLLECTION, STORAGE AND DISPOSAL OF NEW AND SPENT LIQUIDS

BACKGROUND OF THE INVENTION

1. Field Of The Invention

The invention relates to containers for the collection, storage and disposal of new and spent liquids, such as motor oil and the like.

2. Description Of The Prior Art

Conventionally, oil is drained from the sump of the vehicle crankcase by removal of the drain plug and allowing the oil to discharge by gravity flow into a drain pan. The procedure is usually carried out with the vehicle supported upwardly via a lift or elevated ramp and the oil is drained into a large drum.

In the case of individuals who personally change the oil, access to such lift or ramp is usually not available, wherefore the oil changing procedure involves the placement of an open drain pan beneath the drain plug opening.

The collection and disposal of the spent oil has long posed a problem. Of course, dumping into the ground or into such as a sewer line has its obvious objections.

Disposable oil change drain pans have been available but have been costly when as usage was limited to one time only.

Known drain pan collectors of the prior art each suffer the disadvantage of allowing drained oil to remain on its exterior surface following conclusion of the draining program, which oil can soil the user's hands and clothing and can drip onto the garage floor or other surface where the engine is sited.

Additionally, such collectors are not fully cleanable due to the lack of openness of the containers.

OBJECTS OF THE INVENTION

It is an object of the invention to provide an inexpensive, non-disposable container which can initially store and transport new motor oil, or any fluid for that matter, and which can be used in turn as an oil change drain receptacle and provide a system and the means to add new oil to an engine.

Another object is to provide a container for collecting spent liquids, such as a motor oil, having an improved construction.

SUMMARY OF THE INVENTION

An oil drain pan and container combination is intended for use as a container for new crankcase oil so that the oil can be emptied directly into a vehicle crankcase during an oil change program, the capacity of the pan, serving as the container, preferentially being for 6, 7, 8 or 9 quarts.

Such service, as a container for new crankcase oil, of course, follows the earlier usage of the pan for the draining program.

Of course, if desired the container may serve as the reservoir for receiving the spent fluid whereupon after proper sealing off the used oil within the filled container may be discarded.

Stated otherwise, the invention may be defined as a system for collecting fluid from a source and/or pouring new fluid returnably into the source, such as a vehicle engine. the system envisions an open-topped drain pan which can be used in draining the fluid, the drain pan being placed below the drain plug of the source. The wide mouth of the open top ensures against fluid spillage on the pan side wall. The pan is also provided with a top or cover having a diameter complimental to the pan diameter and is threadedly engageable therewith for sealing purposes when sealing is desired. The cover includes a spout at one side thereof to facilitate the draining of the fluid therefrom if such is desired or the pouring of new fluid from within the pan into the source, also as desired.

The pan also includes a manually engageable rim portion for facilitating the transport of the pan to a distant location for the proper disposal of the fluid, and a cap for closing the funnel.

And further, there is provided within the pan and intergral therewith an upstanding base support for the seating thereupon of such as an oil filter for the successful draining of used oil therefrom and into the pan.

The novel features characterizing the invention are delineated by the appended claims.

The foregoing and other objects, advantages and features of the invention will hereinafter appear, and for purposes of illustration, but not limitation, an exemplary embodiment of the invention is shown in the appended drawings.

DESCRIPTION OF THE PREFERRED EMBODIMENT

Figure 1:
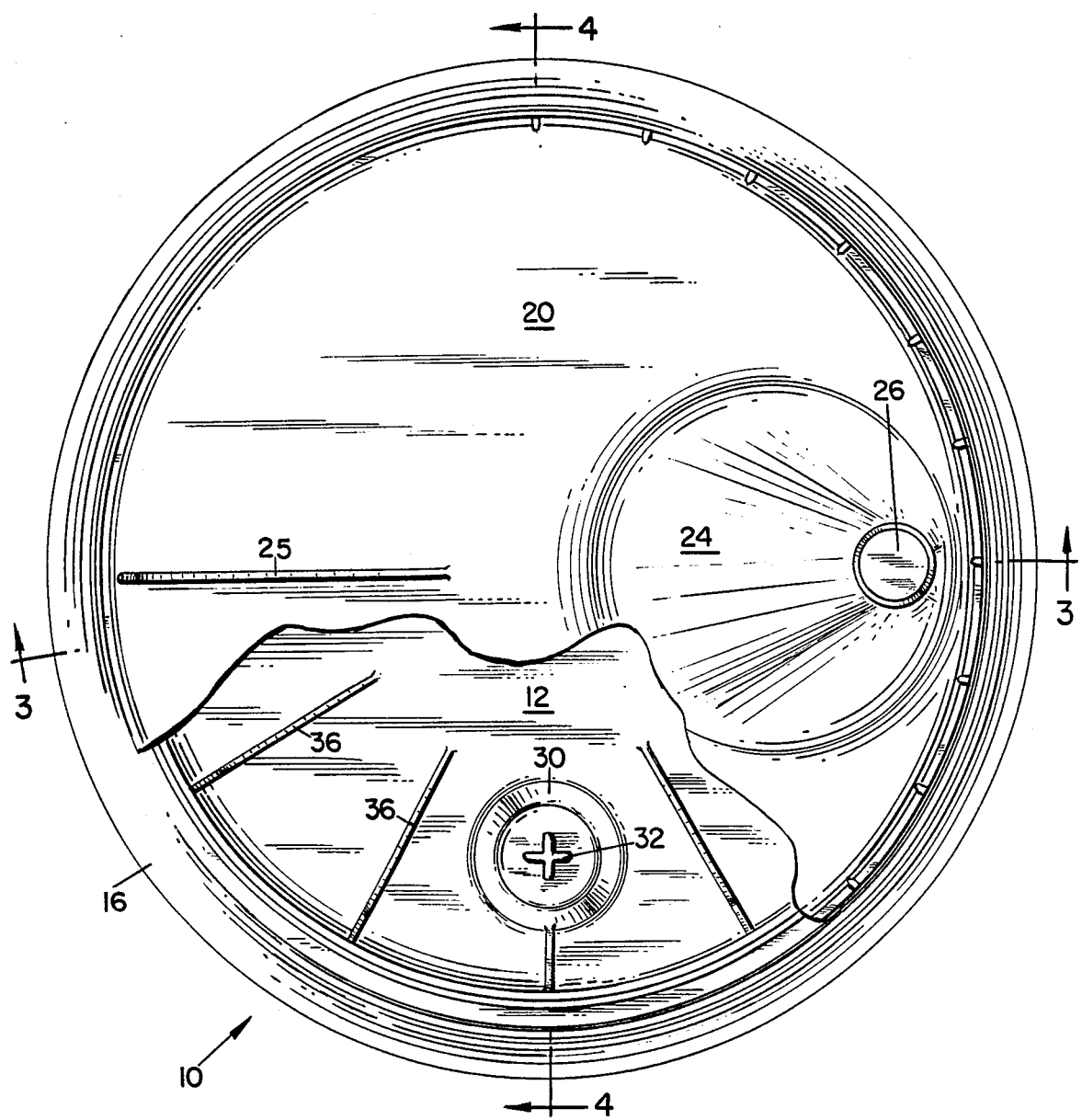
FIG. 1. is a view in top plan, of the lid of the invention, same being partially broken away to reveal features of the pan with which it is in threaded engagement.
Figure 2:
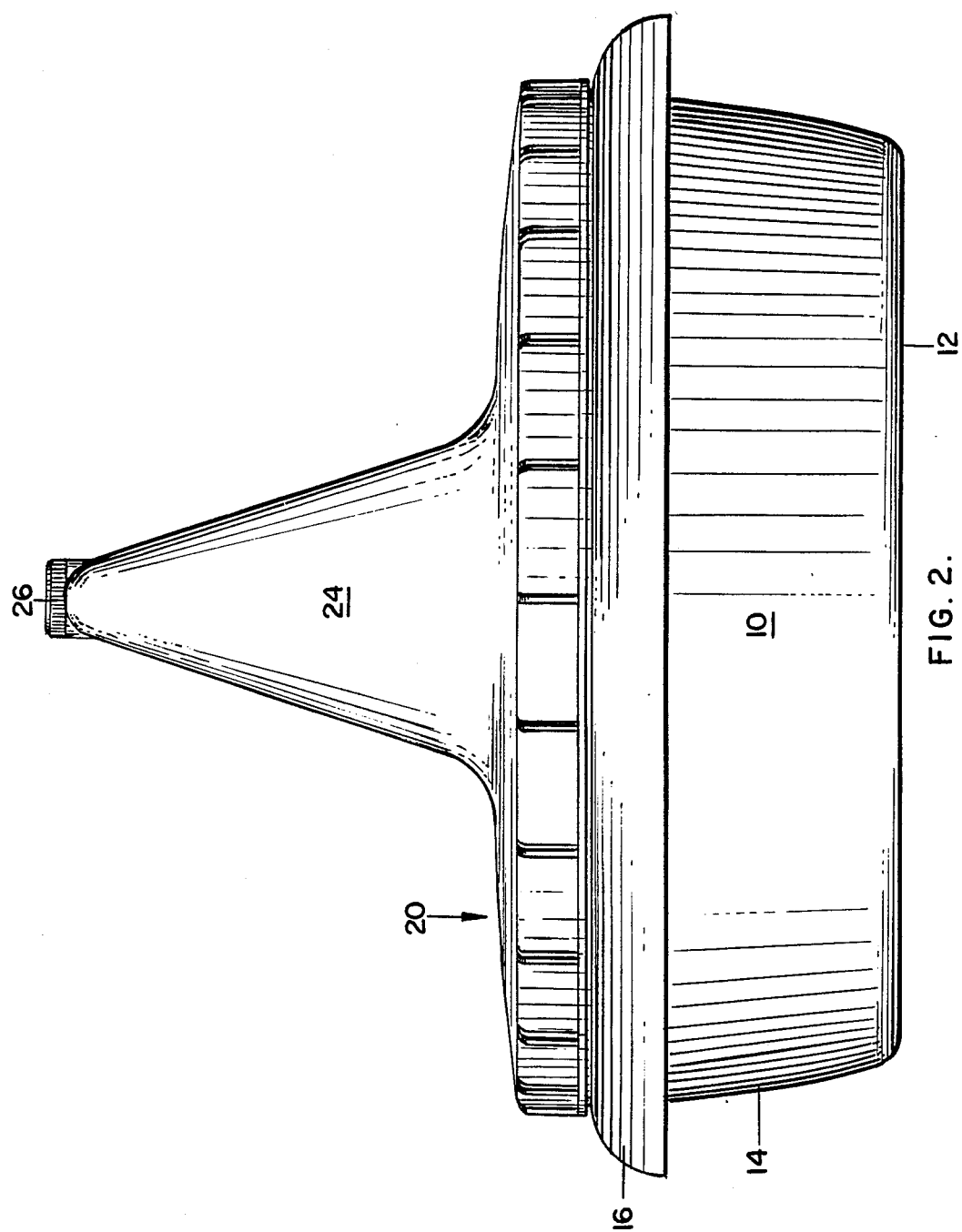
FIG. 2. is a view, in side elevation, of the container or pan with its cooperant lid and closure in an operative position.

With reference first to FIG. 2, the hollow container assembly will be seen to include an annular pan 10 which includes a bottom wall 12 and a connected circular side wall 14.

Side wall 14 is provided adjacent its upper end with an overhanging manually engageable rim or skirt 16 around its outer periphery for aid in lifting and transporting same, as desired.

A depending peripheral rib 17 at the lower end of side wall 14 supports bottom wall 12 upwardly of any surface on which the container may be placed.

Figure 3:
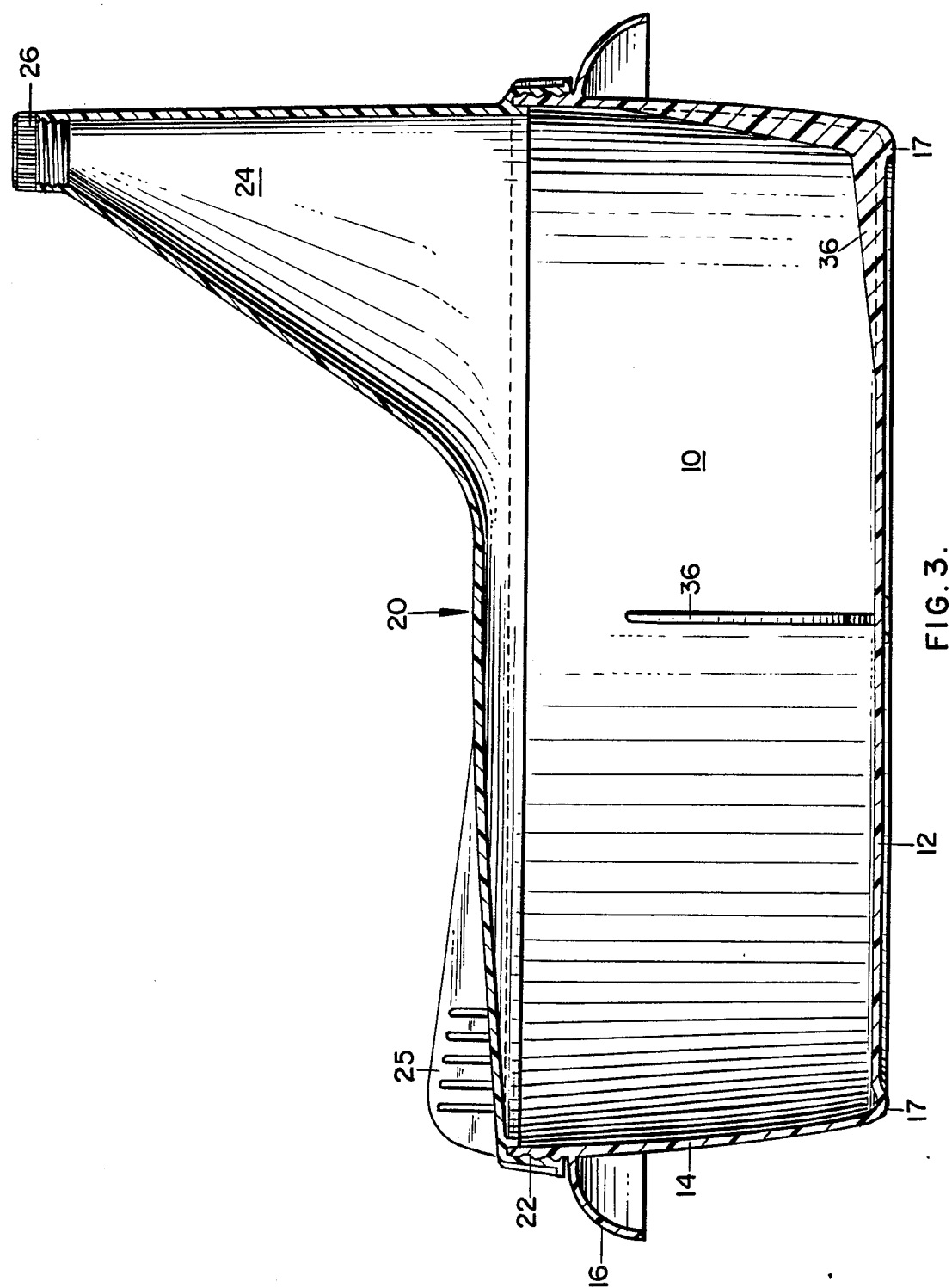
FIG. 3 is a view in section on line 3—3 of FIG. 1.

A lid or cover 20 is of corresponding annular configuration and will be seen to be threadedly engageable at 22 with pan side wall 14 above skirt 16. See FIG. 3.

Lid 20 is configured so as to include an upstanding funnel or pour spout portion 24 for use in the pouring function when it is desired to drain the pan of its contents, be it used or new oil or other fluid.

Lid or cover 20 also has an upstanding rib 25 adjacent funnel or pour spout 24.

The upper outboard extremity of the funnel portion is provided with a removable threadedly engageable closure or cap 26 so that the funnel or pour spout is sealed thereby.

Figure 5:
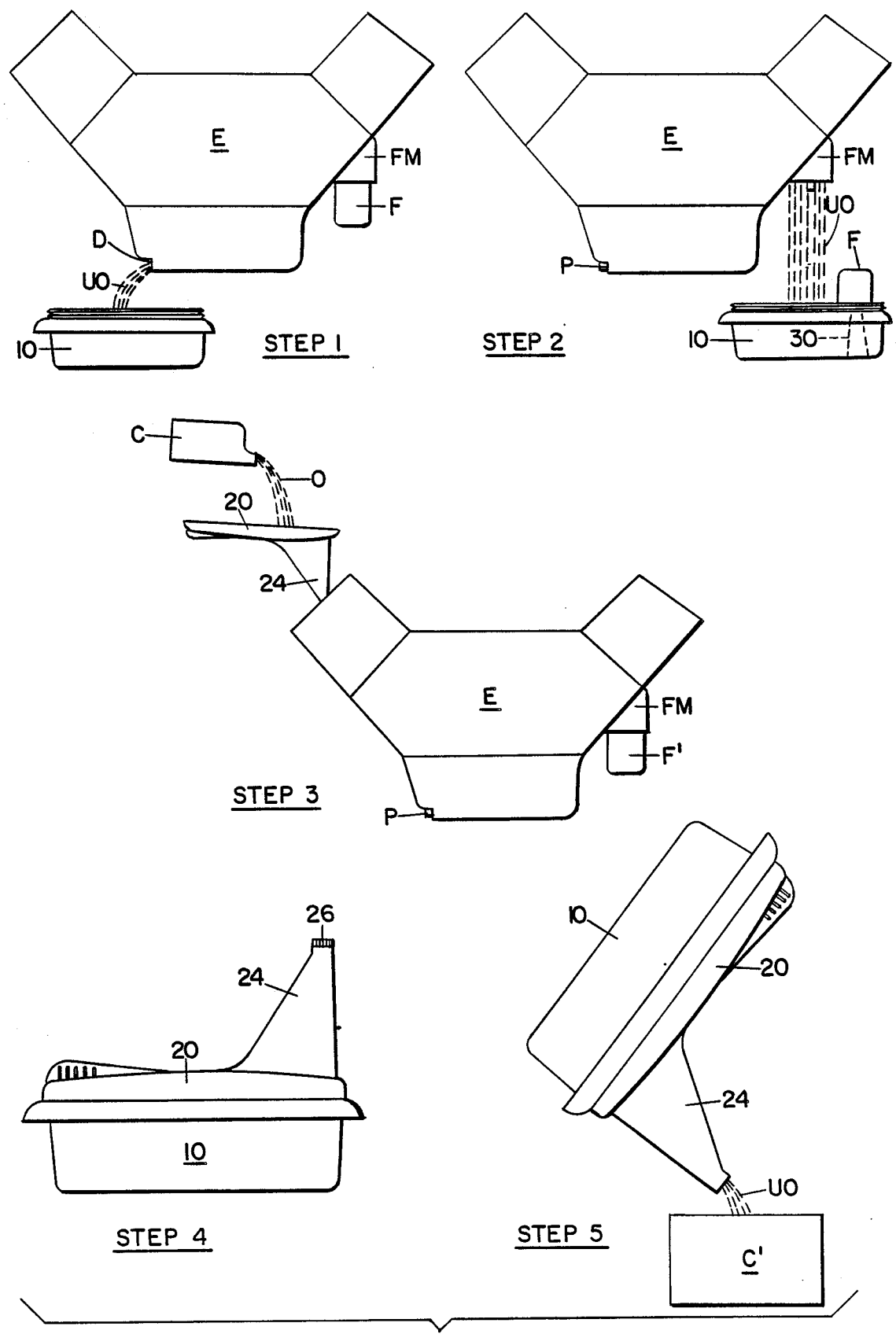
FIG. 5 is a step-by-step graphical representation of the manner of use of the invention.

The lid will be noted to extend across the full diameter of the pan so that when the pan is being used for the draining program, with the lid removed, of course, the pan is readily adapted for placement under the drain plug of the source, such as an engine E, as shown at Step 1 of FIG. 5.

Funnel or pour spout 24, it will be appreciated, is located at one side of pan 10 so as to make the pouring function easier.

As aforesaid, the circular access opening of the pan is bordered by an annular shoulder having external threads for engaging the mating internal threads of the large diameter circular lid 20, thereby providing a fluid seal across the drainage opening when the container is used as a receptacle for containing and transporting new or spent fluid.

As aforesaid, with the lid removed, the pan can serve as the drainage receptacle.

The pan, lid and closure cap are preferably formed of an inexpensive but durable polymer material which is non-reactive to petroleum products which can be worked by conventional molding techniques to provide the desired configuration and dimensions.

The dimensions of the pan should be large enough so that its reservoir will hold a volume of at least 5 quarts or more of oil.

Figure 4:
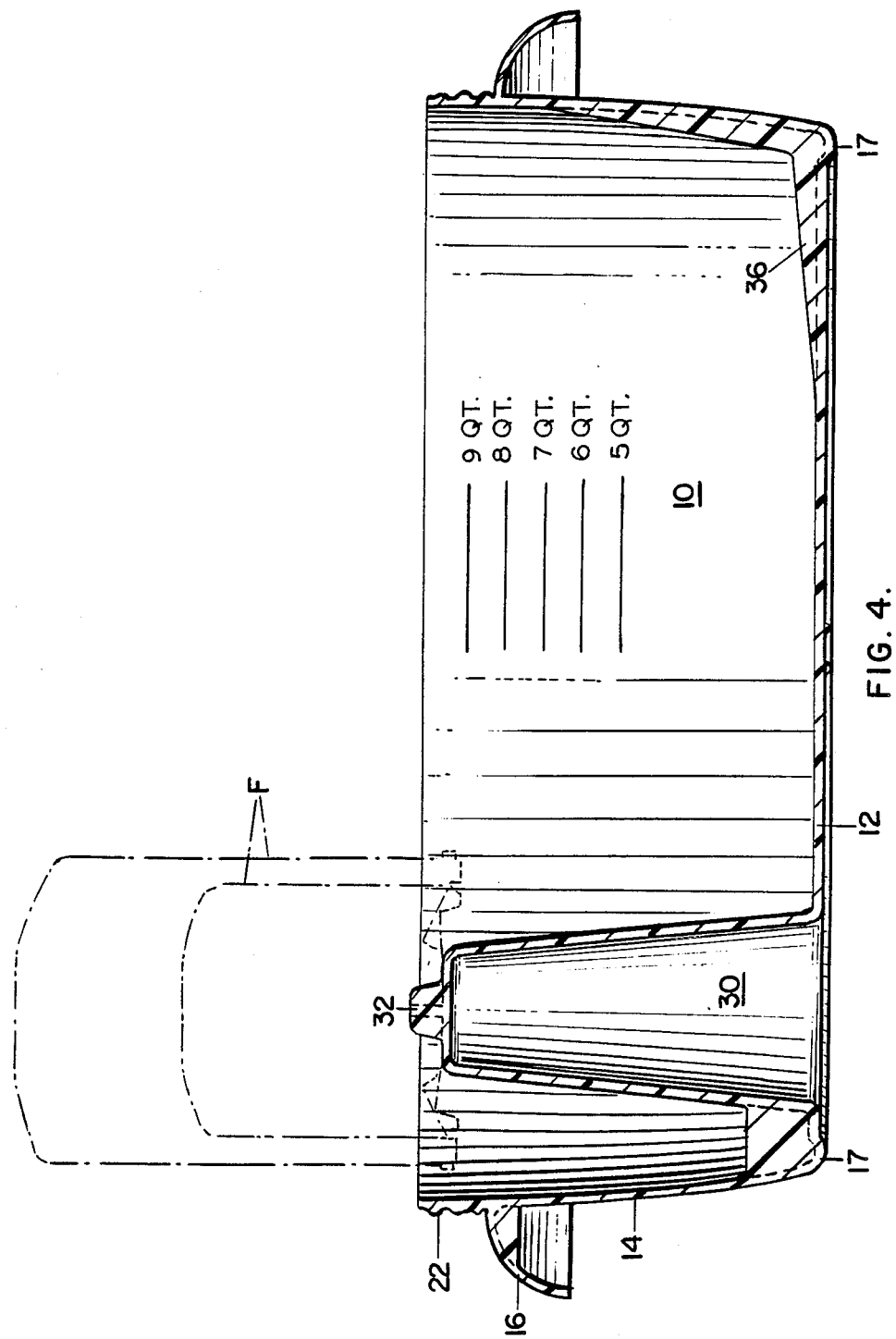
FIG. 4 is a view in section on line 4—4 of FIG. 1 with the lid removed and with an oil filter being shown in phantom for illustrating the use of the invention as a drainage means for the conventional vehicle oil filter.

In the preferred embodiment as illustrated in FIG. 4 the pan is provided with an upstanding shoulder or post 30 which projects upwardly from the pan bottom inboard of the pan side wall and is provided at its top with an upwardly facing cruciform 32 or similar configuration for the reception of an oil filter element F when the same is brought to the pan for the filter drainage function, the cruciform serving to hold the element in situ as the contents thereof are allowed to drain into the pan, as shown at Step 2 of FIG. 5.

The pan may be further provided with upstanding baffles 36 for the well known function of reducing fluid turmoil within the pan during filling, transporting or emptying.

When the pan 10 is utilized for storing or transporting motor oil, as shown at Step 4 of FIG. 5, an important consideration is maintaining the integrity of the seal between pan and lid and between funnel and closure.

It is to be appreciated that the larger diameter removable lid makes the container assembly convertible into a disposable drainage receptacle for oil change purposes and the like.

Further, the container assembly provides secure storage for transportation or handling of liquids such as motor oil.

The entire assembly is formed of inexpensive polymer materials thereby making it inexpensive and suitable for one-time disposable service, if desired.

The function of the base support is to allow the draining of the dirty oil in the oil filter into the pan below, as shown at Step 2 of FIG. 5, for in the oil changing process, it is imperative that one clean the oil filter which usually contains approximately one-half quart of dirty oil.

The wide diameter opening allows drainage directly into the pan without resort to a funnel as shown at Step 1 of FIG. 5, and avoids any mess to clean up following drainage, the spillage of draining oil onto the top or sides of the pan having been substantially precluded.

FIG. 5 is a graphical step-by-step portrayal of the several uses of the invention.

In Step 1, pan 10 is disposed below the drain opening D of an engine E for receiving used motor oil UO.

In Step 2, used filter F has been removed from engine E and placed on shoulder or post 30 of pan 10 for drainage, the pan having been placed below a filter mount FM of engine E for catching additional drippings of used motor oil UO.

In Step 3, drain plug P has been replaced in drain opening D of engine E and a clean oil filter F' replaced in filter mount FM.

New oil from a container C is added to engine E by pouring into lid 20, with the tip of funnel 24 being disposed in the oil entry opening, not shown, of the engine.

In Step 4, pan 10 which contains either used or new oil is sealed by lid 10 and cap 26 and is ready for transport.

In Step 5, a sealed container comprising pan 10 and lid 20 is used to transfer used motor oil UO by funnel 24 into any suitable waste container C'.

I claim:

1. A resuable collecting, dispensing system for collecting and storing and dispensing motor oil from or to a motor vehicle comprising:

an open-face collecting container having a bottom wall and an annular side wall cooperantly defining an interior reservoir with a large diameter uppermost opening and an exterior threaded portion on the side wall adjacent an circumscribing the opening, spaced, upstanding interior baffles on the bottom wall for reduced fluid turmoil, a depending exterior peripheral rib on the bottom wall for supporting the container upwardly of any surface on which it may be placed, a large diameter cover having a downwardly projecting annular shoulder and having an interior threaded portion for interengaging the threaded portion of the container side wall in forming an annular seal when the cover is advanced to the limit of its threaded engagement with respect to the container.

an offset spout at one side of the cover providing a drainage means for emptying oil from the container in one mode of use and providing a funnel for funneling oil into a motor vehicle in another mode of use.

an upstanding rib on the cover adjacent to the spout, a manually engageable annular exterior lip circumscribing and extending outwardly from the container adjacent the opening thereof for facilitating transport of the container, and an upstanding interior base support on the container bottom wall for the support of an oil cartridge during the drainage of the contents thereof into the container.

* * * * *